(12) United States Patent
Sasaki

(10) Patent No.: US 7,097,262 B2
(45) Date of Patent: Aug. 29, 2006

(54) BRAKING FORCE CONTROL APPARATUS AND METHOD FOR VEHICLE

(75) Inventor: Hiroki Sasaki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/834,132

(22) Filed: Apr. 29, 2004

(65) Prior Publication Data

US 2004/0227399 A1    Nov. 18, 2004

(30) Foreign Application Priority Data

May 14, 2003    (JP)    .............................. 2003-136319

(51) Int. Cl.
*B60T 8/60*    (2006.01)
(52) U.S. Cl. ................... 303/147; 303/186; 701/72
(58) Field of Classification Search ............... 303/146, 303/147, 148, 186, 187, 188; 701/72
See application file for complete search history.

(56) References Cited

U.S. PATENT DOCUMENTS

| | | | |
|---|---|---|---|
| 5,282,674 A | | 2/1994 | Matsuda |
| 5,474,369 A | * | 12/1995 | Inagaki et al. ............... 303/146 |
| 5,828,975 A | * | 10/1998 | Isshiki et al. .................. 701/72 |
| 6,027,183 A | * | 2/2000 | Katayose et al. ............ 303/146 |
| 6,178,368 B1 | * | 1/2001 | Otake ............................ 701/72 |
| 6,238,018 B1 | * | 5/2001 | Sugimoto et al. ............ 303/146 |
| 6,322,167 B1 | | 11/2001 | Pruhs et al. |
| 6,349,998 B1 | * | 2/2002 | Franke et al. ................ 303/148 |
| 6,957,873 B1 | * | 10/2005 | Wanke et al. ................ 303/146 |
| 2003/0011241 A1 | | 1/2003 | Batistic et al. |

FOREIGN PATENT DOCUMENTS

| | | |
|---|---|---|
| DE | 101 01 197 A1 | 9/2001 |
| DE | 100 57 279 A1 | 6/2002 |
| JP | 2-171373 A | 7/1990 |
| JP | 2600876 B2 | 1/1997 |

* cited by examiner

*Primary Examiner*—Thomas Williams
(74) *Attorney, Agent, or Firm*—Foley & Lardner LLP (57) ABSTRACT

In braking force control apparatus and method for an automotive vehicle, a front-and-rear road wheel braking force distribution determining section determinatively distributes a front-and-rear road wheel braking force at a front-and-rear road wheel braking force distribution toward front and rear road wheel sides of the vehicle in accordance with a vehicular turning state to achieve the target deceleration and the vehicular deceleration developing section develops the target deceleration on the basis of the front-and-rear road wheel braking force distribution determined by the front-and-rear road wheel braking force distribution determining section.

21 Claims, 9 Drawing Sheets

BRAKING FORCE CONTROL APPARATUS AND METHOD FOR VEHICLE

BACKGROUND OF THE INVENTION

1. Field of the Invention

The present invention relates to braking force control apparatus and method for an automotive vehicle which are capable of stably traveling the vehicle during a turning.

2. Description of the Related Art

A traction control system (TCS) and sideslip prevention system (or vehicular dynamic control (VDC) system) have been well known as a vehicular system which is capable of stably turning the vehicle. Both of the systems have aimed at vehicular stabilization. The former system is to increase stability by securing a lateral force of driven wheels through a suppression of a driving force and provision of a braking force with drive slips detected. The latter provides the braking force for each road wheel independently to stabilize a vehicular behavior in a case where a sideslip angle of the vehicle and a yaw rate are in excess of each corresponding predetermined value. However, under a situation such that a drive slip is not developed, or under a situation that the vehicle enters into a turning, when a vehicle speed thereof exceeds a limit speed set with a radius of the turn taken into account, each of the above-described stabilization systems has not been operated until a, so-called, drift-out motion or spin motion is provoked. A Japanese Patent No. 2600876 issued on Apr. 18, 1997 (which corresponds to a Japanese Patent Application First Publication No. Heisei 2-171373 published on Jul. 3, 1990) exemplifies a previously proposed braking force control apparatus. In the previously proposed Japanese Patent Application first Publication disclosed in the above-described Japanese Patent, a vehicular turning state variable of the vehicle is detected, in a case where the detected turning state variable approaches to a value set with respect to a limit turning state variable up to which the vehicle can stably be traveled, a target deceleration required to travel the vehicle maintaining a stability during the turning of the vehicle is calculated, and the braking force is applied to the vehicle which achieves the target deceleration is provided for the vehicle.

SUMMARY OF THE INVENTION

However, in a case where a front-and-rear road wheel braking force distribution is not sufficiently considered when the braking force is automatically applied to the vehicle in the above-described previously proposed braking force control apparatus, for example, in a case where a braking at an ideal braking force distribution is applied with a higher priority taken to a braking efficiency, an oversteering tendency is often provoked depending upon an operation of the previously proposed braking force control apparatus and depending upon a variation in a road surface μ (frictional coefficient) variation or a load state of the vehicle. On the other hand, in a case where, with the priority of the prevention of the tendency of the oversteering taken, a braking force distribution toward front road wheel sides is merely increased, a tendency of an understeering is often provoked and an effect of a steering operation becomes worse at an exit of the turning.

It is, hence, an object of the present invention to provide braking force control apparatus and method for an automotive vehicle which can always provide a stable turn for the vehicle without deviation of the steering tendency on a vehicular oversteering or understeering tendency in accordance with a turning situation of the vehicle when the braking force is automatically provided for the vehicle.

According to one aspect of the present invention, there is provided a braking force control apparatus for an automotive vehicle, comprising: a turning state variable detecting section that detects a turning state variable of the vehicle from a traveling state of the vehicle; a limit vehicular turning state variable estimating section that estimates a limit turning state variable of the vehicle by which the vehicle is stably enabled to travel from the turning state variable detected by the turning state variable detecting section; a target deceleration calculating section that calculates a target deceleration required when the vehicle approaches to a turning state variable set value set on the basis of the limit vehicular turning state variable estimated by the limit vehicular turning state variable estimating section; a vehicular deceleration developing section that develops the target deceleration of the vehicle calculated by the target deceleration calculating section; and a front-and-rear road wheel braking force distribution determining section that determinatively distributes a front-and-rear road wheel braking force at a front-and-rear road wheel braking force distribution toward front and rear road wheel sides of the vehicle in accordance with the vehicular turning state to achieve the target deceleration calculated by the target deceleration calculating section, the vehicular deceleration developing section developing the target deceleration on the basis of the front-and-rear road wheel braking force distribution determined by the front-and-rear road wheel braking force distribution determining section.

According to another aspect of the present invention, there is provided a braking force control method for an automotive vehicle, comprising: detecting a turning state variable of the vehicle from a traveling state of the vehicle; estimating a limit turning state variable of the vehicle by which the vehicle is stably enabled to travel from the detected turning state variable; calculating a target deceleration required when the vehicle approaches to a turning state variable set value set on the basis of the estimated limit vehicular turning state variable; developing the target deceleration of the vehicle calculated by the target deceleration calculating means; and determinatively distributing a front-and-rear road wheel braking force at a front-and-rear road wheel braking force distribution toward front and rear road wheel sides of the vehicle in accordance with the calculated vehicular turning state to achieve the target deceleration, at the vehicular deceleration developing, developing the target deceleration on the basis of the determined front-and-rear road wheel braking force distribution.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1:
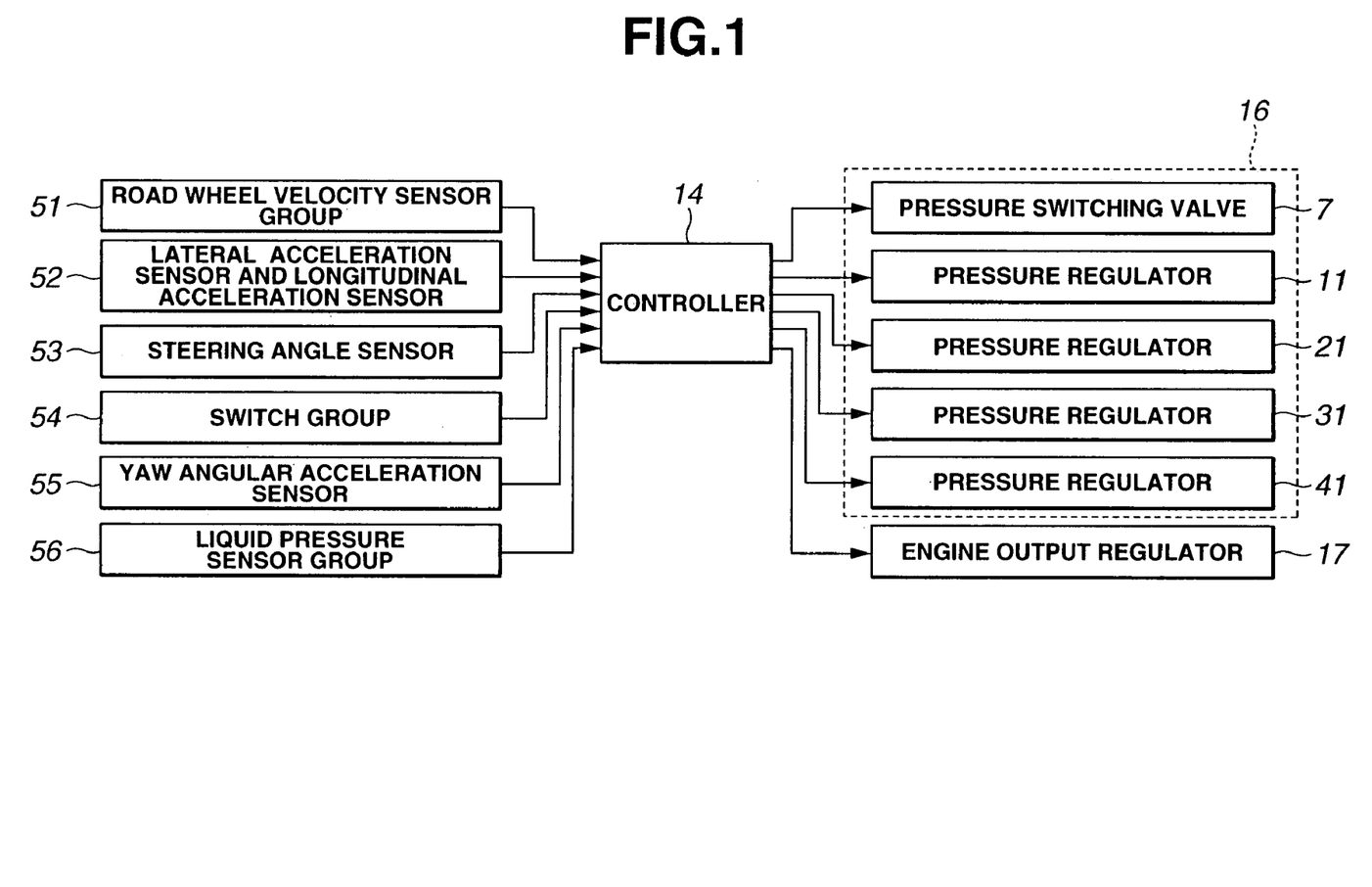
FIG. 1 is a schematic circuit block diagram of a braking control apparatus for an automotive vehicle in a first preferred embodiment according to the present invention.

FIG. 1 shows a schematic circuit block diagram representing a whole system configuration of a braking control apparatus in a first preferred embodiment according to the present invention. In FIG. 1, a road wheel velocity sensor 51 is provided for detecting a road wheel velocity of each road wheel of an automotive vehicle and a detection signal from each road wheel velocity sensor 51 is outputted to a controller 14. In addition, acceleration sensors 52 (52a, 52b in FIG. 2) to detect vehicular body longitudinal and lateral accelerations, a steering angle sensor 53 to detect a steering angular displacement of a steering wheel of the vehicle, a switch group 54 including a brake switch, a pressure responsive switch, an accelerator switch, and so forth, a yaw angular acceleration sensor 55 to detect a yaw angular acceleration around a point of weight of the vehicle, and liquid pressure sensor group 56 to detect the liquid pressure of each wheel cylinder are disposed within the vehicle and detection signals of these sensors 51 through 56 are outputted to a controller 14. It is noted that yaw angular acceleration sensor 55 and liquid pressure group 56 are used according to their necessities in order to improve an accuracy of control.

Figure 2:
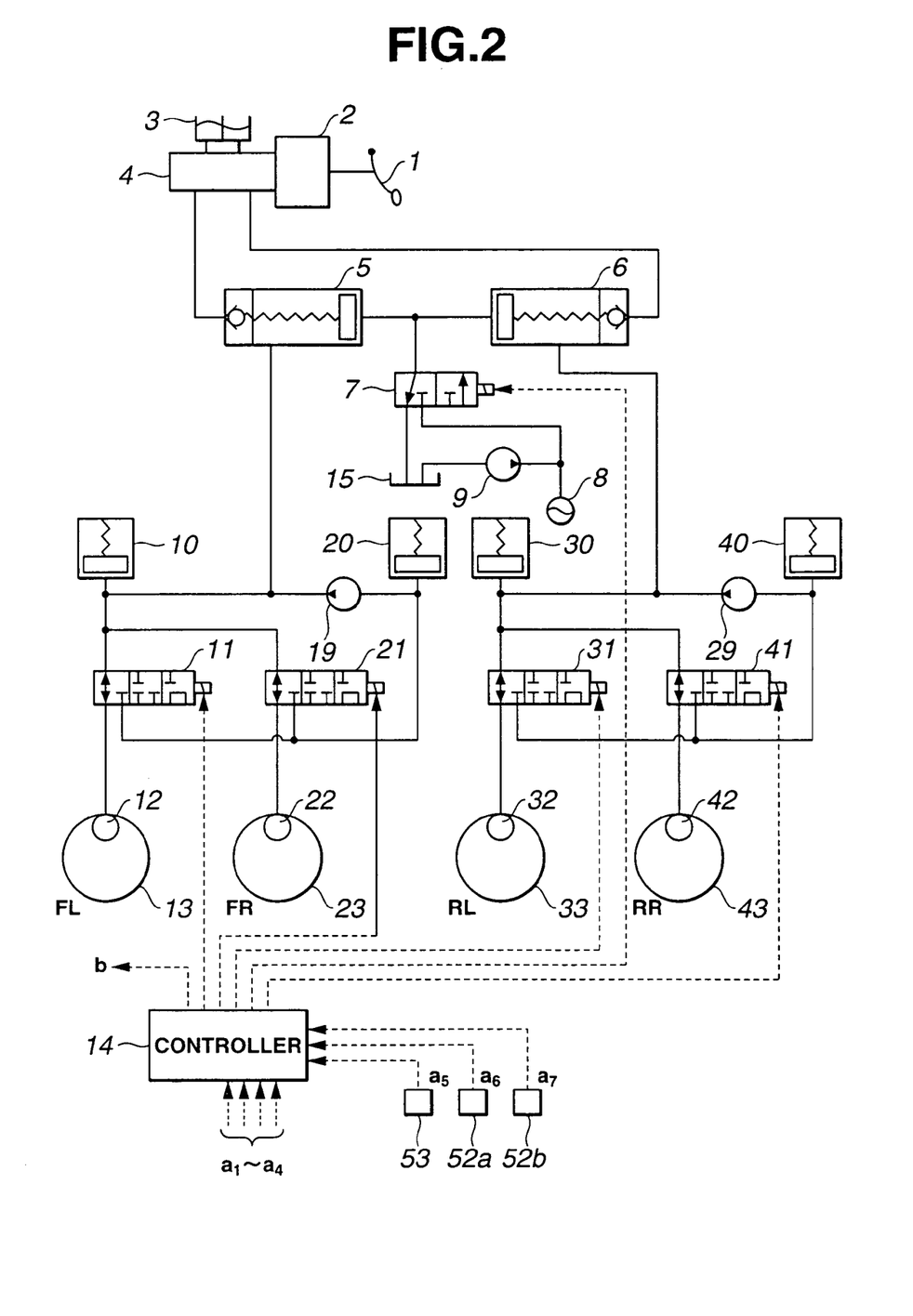
FIG. 2 is a schematic hydraulic-and-electric circuit block diagram of a braking liquid pressure system to which the braking control apparatus shown in FIG. 1 is applicable.

Controller 14 carries out an arithmetic and logic operation on the basis of various kinds of signals from the respective sensors and switches described above and controllably outputs control signals to a brake actuator 16 adjusting brake pressure of front and rear road wheels and an engine output regulator 17. Brake actuator 16 includes a pressure switching valve 7 and pressure regulators 11, 21, 31, and 41 equipped on a brake system of each road wheel. A structure of a braking section (braking means) will be described below with reference to FIG. 2. FIG. 2 shows the brake system to which the braking control apparatus in the first embodiment is applicable. In FIG. 2, a reference numeral 1 denotes a brake pedal. A reference numeral 2 denotes a booster. A reference numeral 3 denotes a reservoir. A reference numeral 4 denotes a master cylinder. Reference numerals 5 and 6 denote plungers. A reference numeral 7 denotes a switching valve. A reference numeral 8 denotes an accumulator. A reference numeral 9 denotes a pump. Reservoirs 3 and 15 may be a single reservoir. Reference numerals 10 and 30 denotes similar accumulators to anti-skid control purpose accumulators. Reference numerals 20 and 40 denote the similar reserve tanks to anti-skid control purpose reserve tanks. Reference numerals 19 and 29 denote pumps. Reference numerals 11, 21, 31, and 41 denote electromagnetic valves. Reference numerals 12, 22, 32, and 42 denote calipers for the respective road wheels. Reference numerals 13, 23, 33, and 43 denote disc rotors for the respective road wheels. Reference symbols a1 through a4 denote output signals from road wheel speed sensors 51 which are used for an anti-skid control system and a traction control system. A reference symbol a5 denotes an output signal from steering angle sensor 53. Reference symbols a6 and a7 denotes signals from vehicular longitudinal and lateral acceleration sensors 52a and 52b. In FIG. 2, yaw angular acceleration sensor 55, liquid pressure sensor 56, and various switch groups 54 are omitted herein. A reference symbol b denotes a control signal supplied to engine output regulator 17.

Figure 3:
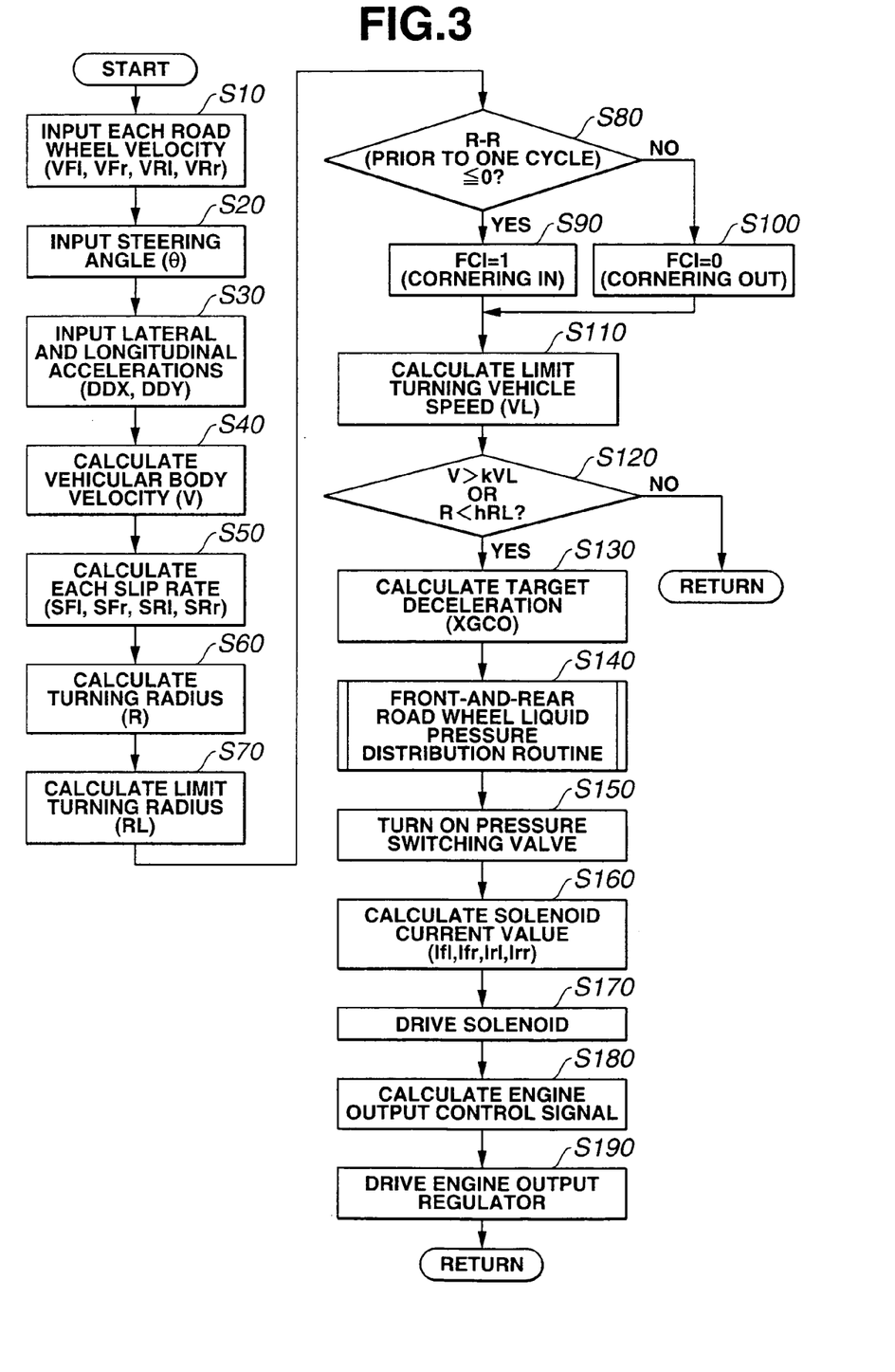
FIG. 3 is an operational flowchart for explaining a control process flow executed in the braking control apparatus in the first embodiment shown in FIG. 1.

Next, from among various processes executed by controller 14, a braking control process related to the present invention will be described below with reference to an operational flowchart of FIG. 3. The braking control process shown in FIG. 3 is executed for each predetermined sampling period. First, at a step S10, controller 14 inputs each road wheel speed (velocity) (VF1, VFr, VR1, and VRr) of front left and right road wheels. Next, at a step S20, controller 14 inputs steering angle θ. At a step S30, controller 14 receives vehicular (body) longitudinal and lateral accelerations DDX and DDY. At a step S40, controller 14 calculates vehicle body speed (velocity) V from each road wheel velocity and vehicular body front-and-rear (longitudinal) acceleration. At a step S50, controller 14 derives slip rates SF1, SFr, SR1, and SRr of respective front left and right road wheels (F1, Fr, R1, and Rr) from respective road wheel velocities and the vehicular body velocity (speed) V. At a step S60, controller 14 calculates a turning radius R on the basis of the following equation from vehicular body speed V and vehicular body lateral acceleration DDY.

$$R = (V^2 / DDY)$$

At a step S70, controller 14 determines a limit turning radius RL at a present vehicle body velocity V from the vehicle body velocity V. For example, suppose that the limit vehicle body lateral acceleration defined by the vehicle is DDY1.

$$RL = (V^2 / DDY1).$$

At a step S80, controller 14 determines whether the vehicular turning state is being transferred toward the direction in which the turning radius becomes small or the turning radius is constant (remains unchanged) or not on the basis of the following equation.

$$R(n) - R(n-1) \leq 0$$

(n denotes a present value and n−1 denotes a previous value (at a previous control cycle) to the present value). If the vehicular turning state is being transferred toward the direction in which the turning radius becomes small or remains unchanged (Yes), the routine goes to a step S90. If the vehicular turning state is being transferred toward the direction in which the turning radius becomes large (No) at step S80, the routine goes to a step S100.

At step S90, "1" is substituted into turning direction flag FC1 and the routine goes to a step S110. At step S100, controller 14 determines limit turning speed VL in the present turning radius VL and the routine goes to a step S120. It is noted that a limit vehicle body lateral acceleration is denoted by DDY1.

$$VL = \sqrt{(R \cdot DDY1)}$$

It is noted that limit vehicle body lateral acceleration DDY1 may be varied according to slip rates of each road wheels SF1, SFr, SR1, SRr. In addition, the control over ant-skid or traction control may have a higher priority depending upon each road wheel slip rate of SF1, SFr, SR1, and SRr. At a step S120, controller 14 determines which value turning radius R is present with respect to limit turning radius RL or determined which value of vehicle body speed V is present with respect to limit turning vehicular velocity VL. If either of these values V or R is in excess of a certain allowance value kVL or hRL (provided that k, h<1) (yes), the routine goes to a step S130. If not in excess of the allowance value (No), the process shown in FIG. 3 is ended, namely, the present routine is ended and is returned to step S10. It is noted that coefficients k and h of allowance values kVL and hRL are previously set as coefficients slightly smaller than one.

At step S130, controller 14 calculates a target deceleration XGCO on the basis of vehicular body velocity V, limit vehicle body speed VL, turning radius R, and limit turning radius RL and the routine goes to a step S140.

At step S140, controller 14 activates a front-and-rear road wheel braking liquid pressure distribution routine, selects the front-and-rear braking force distribution in accordance with the turning state, distributes a target braking liquid pressure of each front-and-rear road wheel side to obtain target deceleration XGCO at front left and right road wheel braking force distribution and the routine goes to a step S150.

At step S150, controller 14 turns on pressure switching valve 7 (a state at a right side viewed from FIG. 2). Thus, the liquid pressure within accumulator 8 is acted upon each plunger 5 and 6 and the liquid pressure within each plunger 5 and 6 is supplied to corresponding pressure regulators 11, 21, 31, and 41. At a step S160, controller 14 derives supply currents iFL (Ifl), iFR (Ifr), iRL (Irl), and iRR (Irr) to each solenoid of pressure regulators 11, 21, 31, and 41 required to obtain target brake liquid pressures distributed for respective front and rear road wheels and so as to carry out a braking liquid pressure control to obtain the vehicular target deceleration. In details, when valve positions of their pressure regulator valves 11, 21, 31, and 41 are as those shown at a left side thereof in FIG. 2, the liquid pressure is supplied from plungers 5 and 6 to calipers of the brake 12, 22, 32, and 42 so as to pressure increase in the bake pressure. In addition, when the valve positions thereof are placed at neutral positions, a liquid pressure passage is interrupted so that the brake pressure is maintained constant. On the other hand, since the valve positions thereof are placed on the right side position of FIG. 2, the braking liquid is retuned to reserve tanks 20 and 40 to release the braking liquid pressure. As described above, the switched positions of pressure regulators 11, 21, 31, and 41 are controlled so that the brake pressure for each of front left and right and rear left and right road wheels is controlled. It is noted that the liquid pressure of reserve tanks 20 and 40 is returned to reservoir 3 by means of pumps 19 and 29.

Then, at a step S180, controller 14 calculates an engine output control signal to obtain target deceleration XGCO. For example, in a case an engine output control is carried out according to the opening angle of the throttle valve, controller 14 determines a target throttle valve opening angle with a relationship between the deceleration obtained by the brake and the engine output taken into account and calculates the control signal to obtain the target throttle valve opening angle. At the next step S190, controller 14 drives engine output regulator 17. In the example described above, engine output regulator 17 corresponds to a driver of the throttle valve. It is noted that steps S10 through S60 correspond to a turning state detecting section (means), steps S70 and S110 correspond to a limit turning state variable detecting section (means), step S130 corresponds to a target deceleration calculating section (means), steps S150 through S190 correspond to vehicular deceleration developing section, and step S140 defining the front-and-rear road wheel liquid pressure distribution routine corresponds to a front-and-rear road wheel braking force distribution determining section (means).

Figure 4:
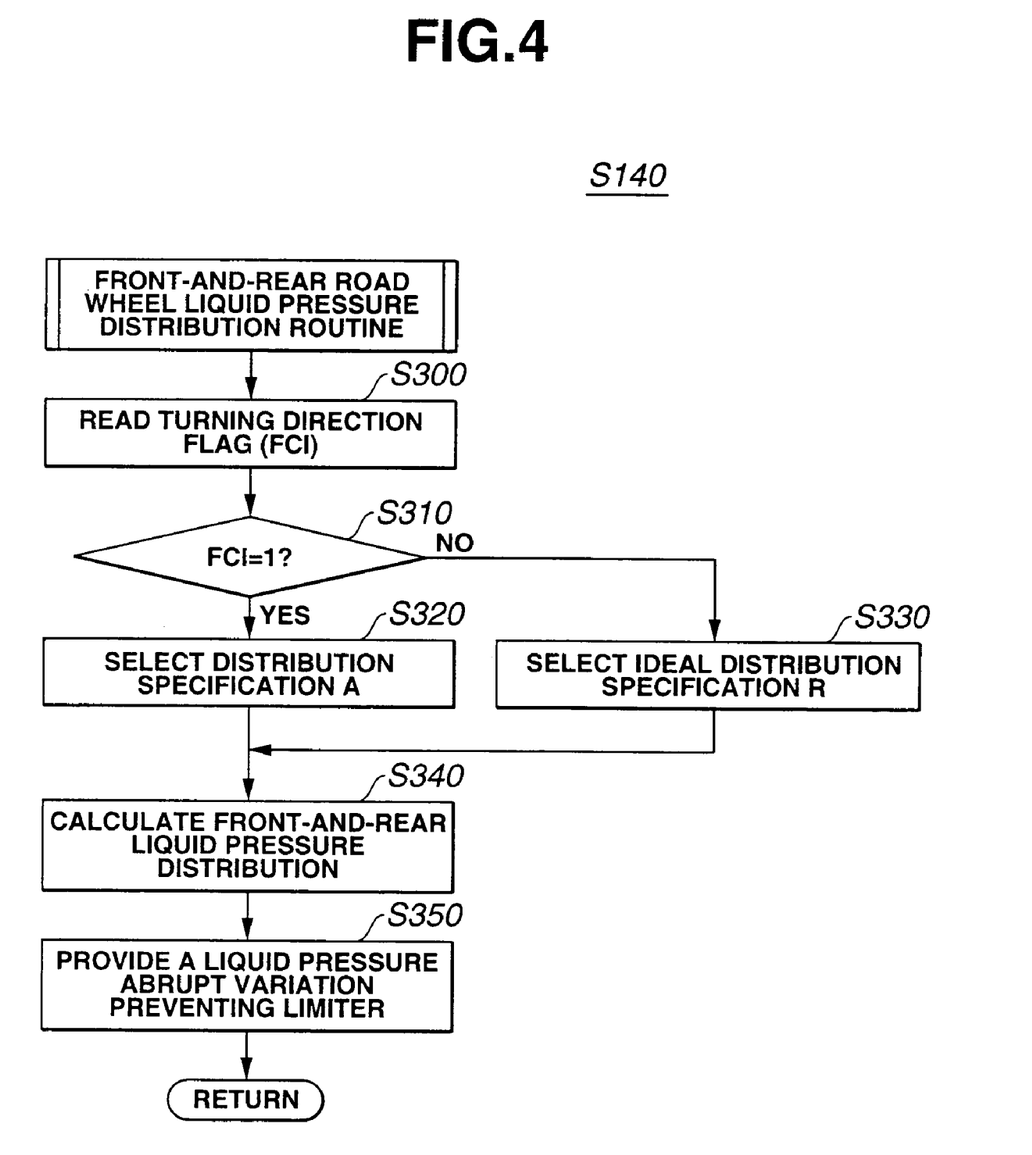
FIG. 4 is an operational flowchart for explaining a detailed routine of front-and-rear road wheel braking liquid pressure distribution at a step S140 shown in FIG. 3.

Next, the detailed processing routine of step S140 (front-and-rear road wheel braking liquid pressure distribution routine) will be described with reference to a detailed flowchart of FIG. 4.

Figure 5:
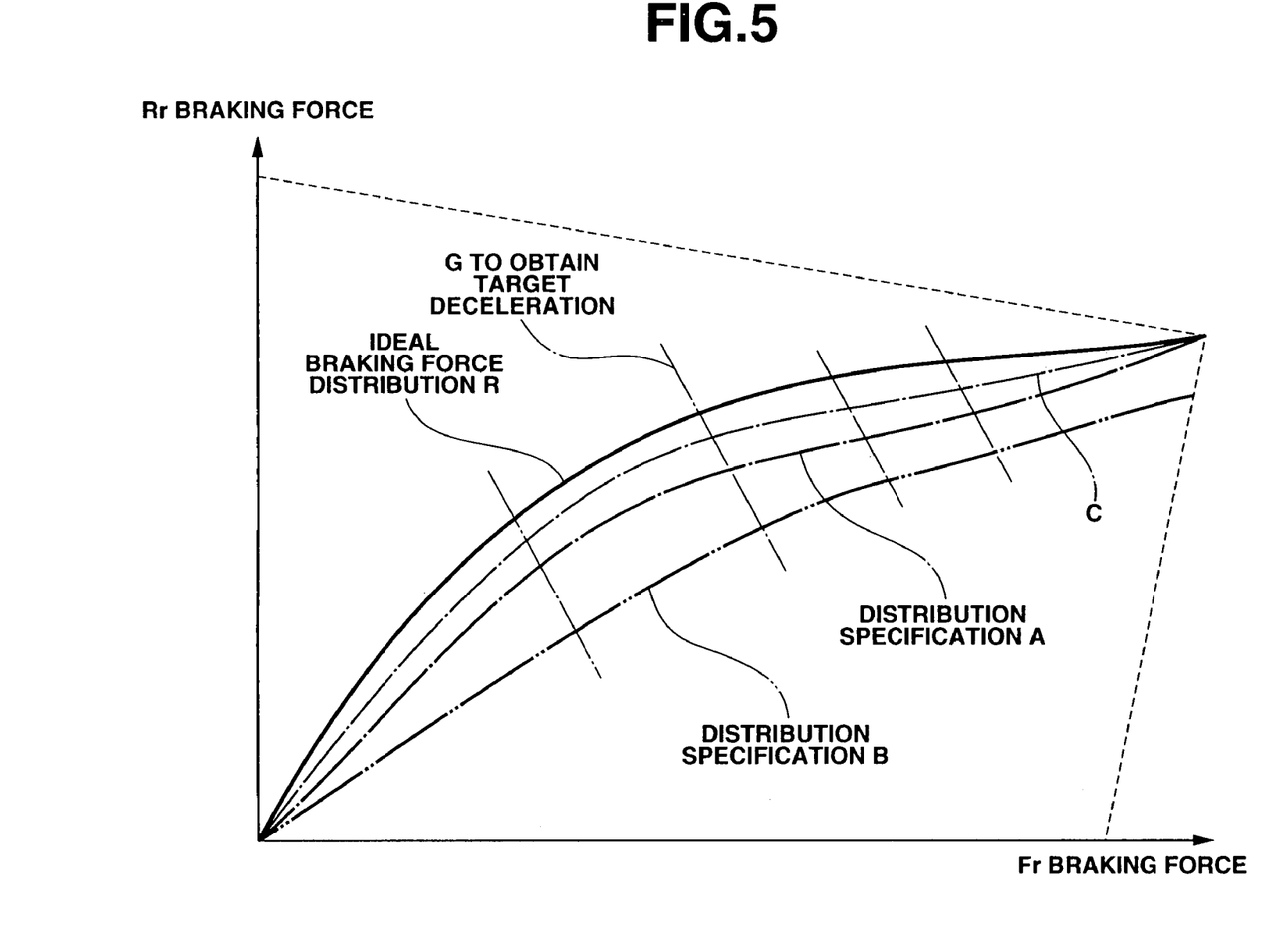
FIG. 5 is an explanatory view of a map of front-and-rear road wheel braking force distribution specifications used in the braking control apparatus according to the present invention.

It is noted that, in this embodiment, as shown in FIG. 5, a map related to a distribution specification R according to an ideal front-and-rear road wheel braking force distribution and related to another distribution specification A in which a front road wheel side braking force is slightly larger than the braking force distribution toward the rear road wheel side is prepared. During the vehicular state being transferred into a direction in which the turning radius becomes small, the distribution specification A is selected so that each braking liquid pressure of front-and-rear road wheels is calculated to perform the braking.

At steps S300 and S310, controller 14 reads turning direction flag FCl and determines whether turning direction flag FCl is set to "1", namely, whether the turning state is being transferred to the direction in which the turning radius becomes decreased or the turning radius is constant (remains unchanged). If controller 14 determines that the turning state is transferred into the direction in which the turning radius becomes small or that the turning radius is constant (Yes), the routine goes to a step S320. At step S320, controller 14 selects distribution specification A in which the front road wheel side braking force is larger than that of the ideal braking force distribution as the front-and-rear road wheel liquid pressure distribution and the routine goes to a step S340. On the other hand, in a case where controller 14 determines that the turning state is transferred to the direction in which the turning radius becomes large (No) at step S310, the routine goes to a step S330 in which controller 14 selects ideal braking force distribution specification R which is the ideal braking force distribution and the routine goes to a step S340.

At step S340, controller 14 calculates the distributed liquid pressures for the front and rear road wheels to obtain target deceleration XGCO in the front-and-rear braking force distribution according to the selected specification from the map corresponding to FIG. 5 or so forth. At a step S350, controller 14 applies a strong filtering toward the distributed liquid pressures for the front and rear road wheels in order to suppress an abrupt change in the liquid pressures for the front and rear road wheels and the routine is returned to step 140, i.e., main routine shown in FIG. 3.

Next, action and advantage of the braking control apparatus in the first embodiment will be described below. When the vehicle approaches to a stably turnable limit during the turning of the vehicle, the vehicle is positively decelerated so that the vehicle is braking controlled irrespective of an intention of the vehicle driver so as not to exceed a stably turnable limit. In this embodiment, at this time, in a case where the vehicle is transferred toward an strengthened steering state of the vehicle (namely, in a direction toward which the turning radius becomes small) (specifically, when the vehicle enters a cornering), one of the front-and-rear wheel braking force distribution specification in which the distribution toward the front road wheel side is increased (namely, the distribution toward the rear road wheel side is decreased) than the ideal braking force distribution without modification of a total braking force is selected so as to suppress the tendency of the oversteering to secure a stability of the vehicle.

On the other hand, in a case where the vehicle state is transferred in the direction in which the turning state becomes weakened (namely, in the direction in which the turning radius becomes large), namely, in a case where the steering wheel is returned toward the opposite direction from the present position thereof, the front-and-rear road wheel braking force distribution is returned to the ideal braking force distribution. As compared with the case where an effect of the steering is relatively improved as compared with the strengthened steering state. That is to say, the understeering tendency is suppressed so as to assure a turnability (or a turning performance) of the vehicle.

It is noted that, even in a case where a constant steady-state turning state of the turning radius, the distribution specification A is selected as front-and-rear road wheel braking force distribution. However, the distribution specification is not limited to this. For example, a third front-and-rear distribution specification C (refer to FIG. 5) located in an intermediate position between ideal distribution specification R and distribution specification A may be set so that the front-and-rear distribution specification C may be selected. In addition, in this embodiment, the distribution specification during the transfer toward the direction in which the turning radius becomes small is fixed to distribution specification A. However, the distribution specification is not limited to this. For example, the selected distribution specification may be modified in accordance with the vehicle speed and, as the vehicle speed becomes higher, the distribution specification in which the front road wheel side distribution specification is larger may be selected. It is noted that, even in this case, the controller 14 controls the deceleration to obtain the target deceleration.

In addition, in this embodiment, the front-and-rear road wheel braking force distribution is determined in accordance with the transfer in the turning radius magnitude direction. However, the braking force distribution is not limited to this. For example, with maps corresponding to a plurality of braking force distribution specifications prepared, the braking force distribution specification may be selected in which the front road wheel side braking distribution becomes larger as the turning radius becomes smaller. At this time, with the vehicle speed taken into consideration, the larger braking force distribution specification in the front road wheel side may be selected as the vehicle speed becomes larger (higher).

Furthermore, in this embodiment, as the turning state variables, the turning radius and the turning speed or transfer direction of the magnitude of the turning radius is used. However, the turning state variables are not limited to this. A value by which the turning state of the vehicle can be represented (such as a yaw rate, steering angle, lateral G, left-and-right road wheel speed difference) may be the turning state variable. In this alternative case, the direction in which the turning radius becomes small may be set to the direction in which the value becomes large.

(Second Embodiment)

Next, a second preferred embodiment of the braking force control apparatus will be described below. It is noted that the same reference numerals as those described in the first embodiment designate the corresponding elements. A part of or a whole braking control process of the process executed at controller 14 is different from that of the first embodiment (refer to FIG. 7) and the front-and-rear liquid pressure distribution routine (FIGS. 8A through 8D) is different from that of the first embodiment.

Figure 7:
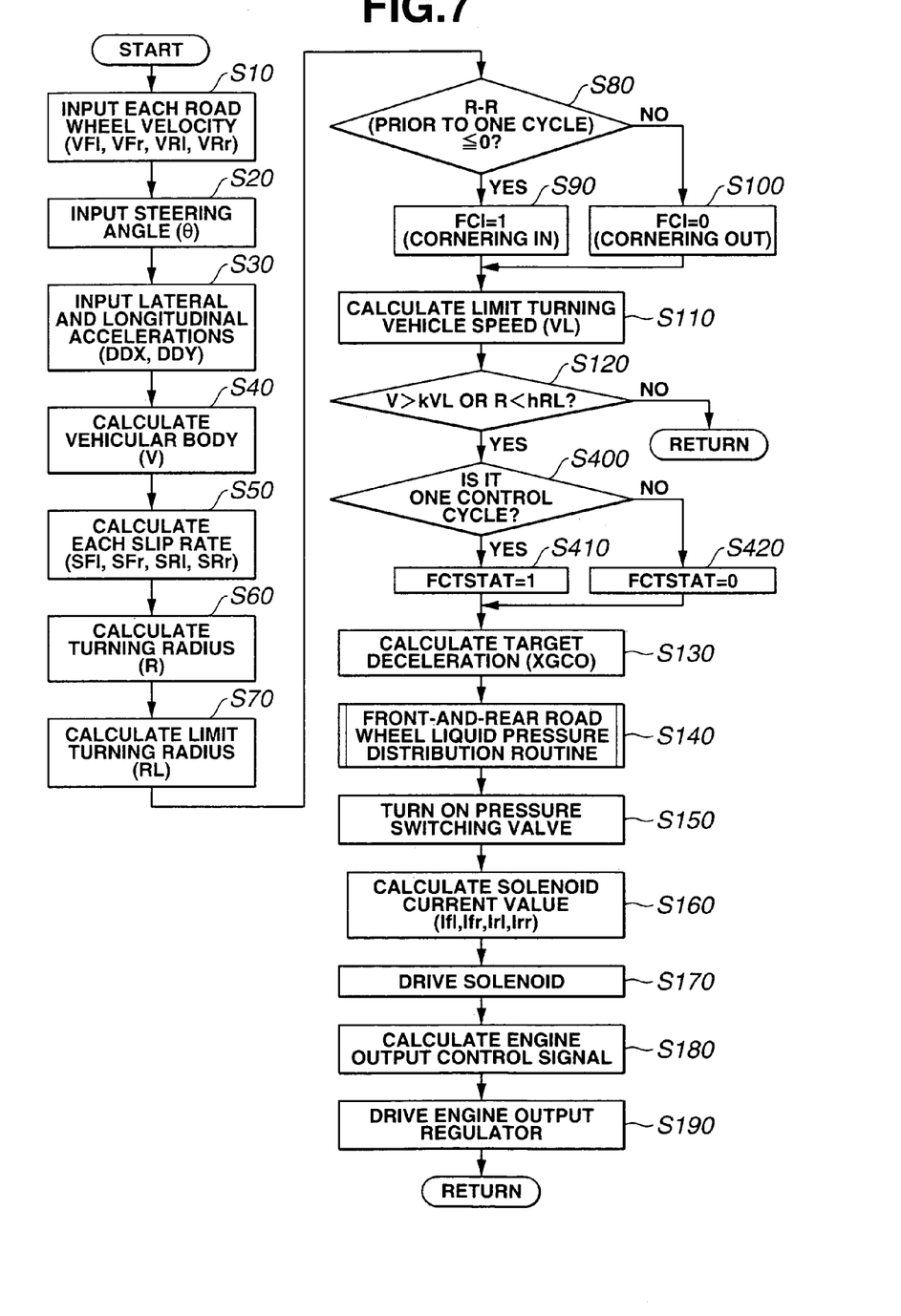
FIG. 7 is an operational flowchart representing a process flow in a case of a second preferred embodiment of the braking control apparatus according to the present invention.

FIG. 7 shows the process executed by the braking control processing section of controller 14. A basic process of the braking control procedure is generally the same as the first embodiment shown in FIG. 3. However, the difference is that steps 400 through 420 are inserted into a part of process between step S120 and step S130. Hence, only the difference points will be described below with reference to FIG. 7.

That is to say, at step S120, controller 14 determines that the turning state of the vehicle approaches to a turning state indicating the stably turnable limit, namely, that the start of the braking control is carried out or the braking control is being executed, the process shown in steps S400 through S420 is carried out and the routine goes to step S130.

At step S400, controller 14 determines whether it (the present time) is now in a control first (one) cycle. If it is in the control first cycle (Yes) at step S400, "1" is substituted into a braking control initial flag FCTSTAT at a step S410. If the present time is not in the control first cycle (No) at step S420, "0" is substituted into initial flag FCTSTAT at step S420. It is noted that the control one cycle means a first cycle of an execution of the braking control.

The front-and-rear road wheel liquid pressure distribution routine in the second embodiment will be described with reference to FIGS. 8A through 8D. That is to say, at a step S500, controller 14 determines whether it (the present time) is (in) the control first (one) cycle. If it (the present time) is in the control first (one) cycle (No), the routine goes to a step S510. If it is not in the control first cycle (Yes) at step S500, the routine goes to a step S530. At step S510, controller 14 selects a basic distribution specification A (refer to FIG. 5) in which the braking liquid pressure distribution toward the front road wheel side is larger than the ideal braking force distribution as an initial value of the braking control and the routine goes to a step S520. As shown in FIG. 5, the front-and-rear braking force distribution is selected in a predetermined range with the ideal braking force distribution R as an upper limit and with the basic specification B in which the front road wheel side braking force (braking liquid pressure) distribution is larger than basic distribution specification A as a lower limit. At step S520, controller 14 derives initial front road wheel distribution liquid pressure (PFR=PFRINI) and initial rear road wheel side distribution liquid pressure (PRR=PRRINI). The respective distribution liquid pressures are set as follows and the routine is returned to step S140.

PFR=PFRINI

PRR=PRRINI

Figure 8A:
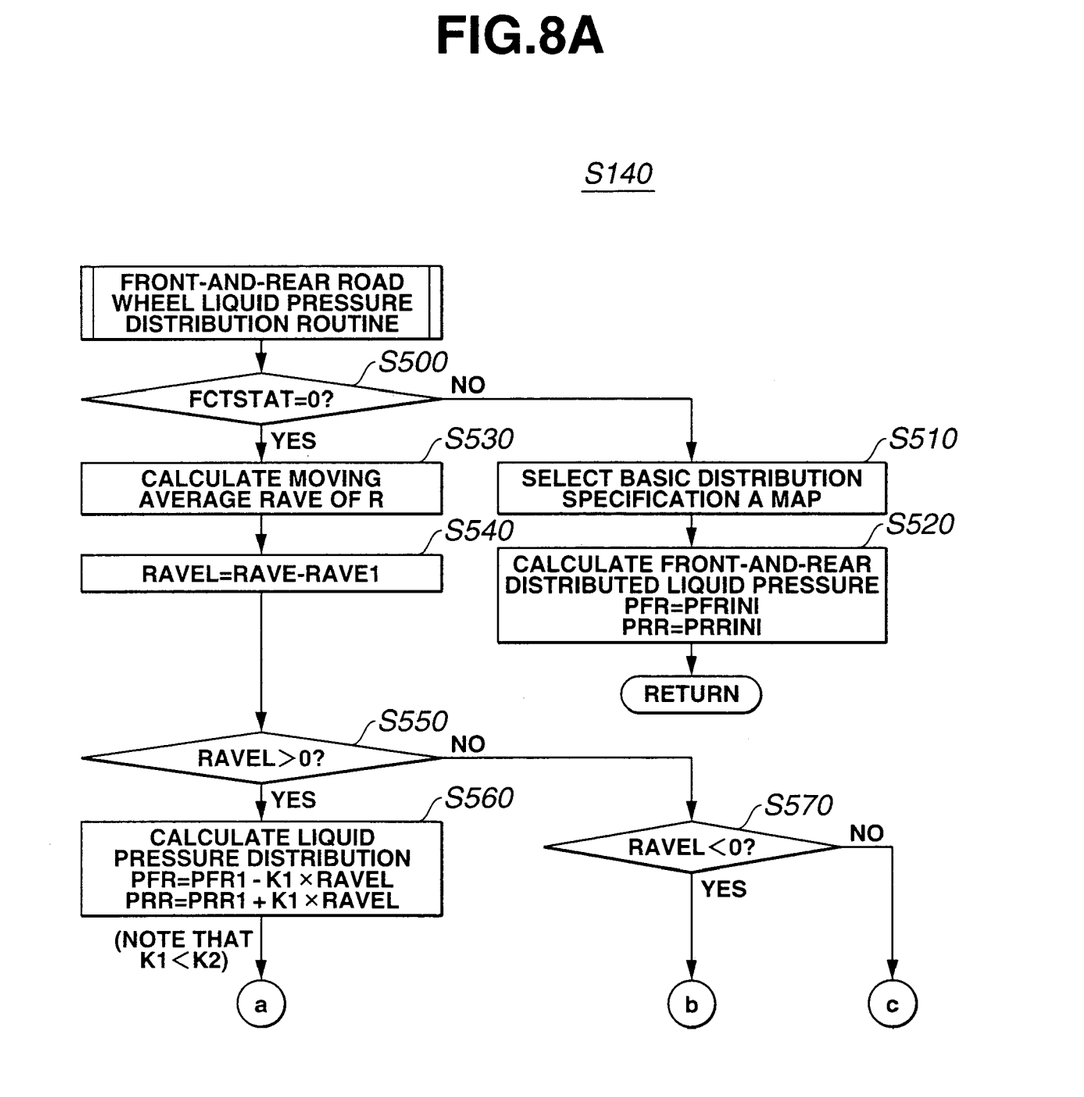
FIGS. 8A, 8B, 8C, and 8D are integrally a detailed operational flowchart of the front-and-rear road wheel braking force distribution at step S140 in the braking control apparatus of the second embodiment shown in FIG. 7.

On the other hand, at step S530, controller 14 derives a moving average RAVE of turning radius R in the following equation and the routine goes to a step S540.

RAVE(n)=(R(n)+R(n−1)+R(n−2)+R(n−3)+R(n−4))/5

At step S540, controller 14 derives a difference value with respect to a previous value of moving average RAVE to calculate a variation speed in the direction in which turning radius of R is varied and the routine goes to a step S550.

RAVEL=RAVE(n)−RAVE(n−1)

At a step S550, controller 14 determines the direction (large, equal, or small) of a vehicular turning radius magnitude on the basis of difference value of RAVEL described above. If controller 14 determines that the turning state of the vehicle is transferred toward the direction in which the turning radius becomes large (yes) at step S550, the routine goes to a step S560. If does not become large (No) at step S550, the routine goes to a step S570. At step S560, controller 14 decreases (makes small) the liquid pressure distribution toward the front road wheel side by a quantity corresponding to a variation rate of the turning radius and increases (enlarges) the liquid pressure distribution toward the rear road wheel side. Then, the routine goes to a step S580.

$PFR(n)=PFR(n-1)-K1 \times RAVEL$ $PRR(n)=PRR(n-1)+K1 \times RAVEL$

As described above, the distribution of the rear road wheel side is decreased by the quantity corresponding to the large front road wheel side liquid pressure distribution so as to totally suppress the variation in the braking force to achieve the target deceleration. It is noted that K1 denotes a first coefficient. It is noted that, in the second embodiment, the control first (one) cycle is a reference as a target deceleration. However, on the basis of the target deceleration derived at each control cycle, the difference of the target deceleration from the previous value thereof may use corrections of front and rear road wheel side braking liquid pressure distributions PFR(n) and PRR(n).

Figure 8B:
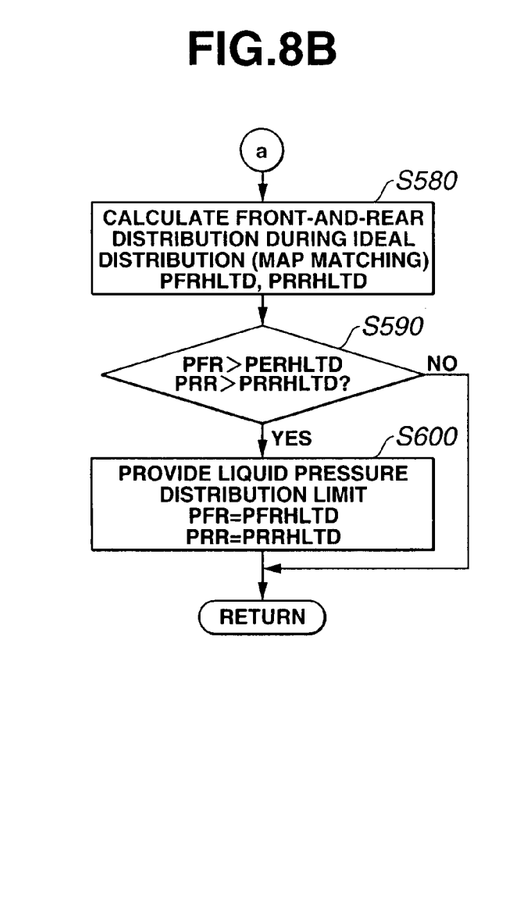

At a step S580, controller 14 derives front-and-rear road wheel distribution values PFRHLTD and PRRHLTD at ideal distribution specification R and the routine goes to a step S590. At a step S590, controller 14 determines whether the front-and-rear liquid pressure distribution value is larger than the case of the ideal braking force distribution on the basis of the following equation.

$PFR(n)>PFRHLTD$ and $PRR(n)>PFRHLTD$

In a case where at least one of front and rear liquid pressure distribution values is larger than the value of the ideal braking force distribution, a limitation is placed on the upper limit by the front-and-rear liquid pressure distribution value during the ideal braking force at step S600 as described in the following equation.

$PFR(n)=PFRHLTD$ and $PRR(n)=PRRHLTD$

Figure 8C:
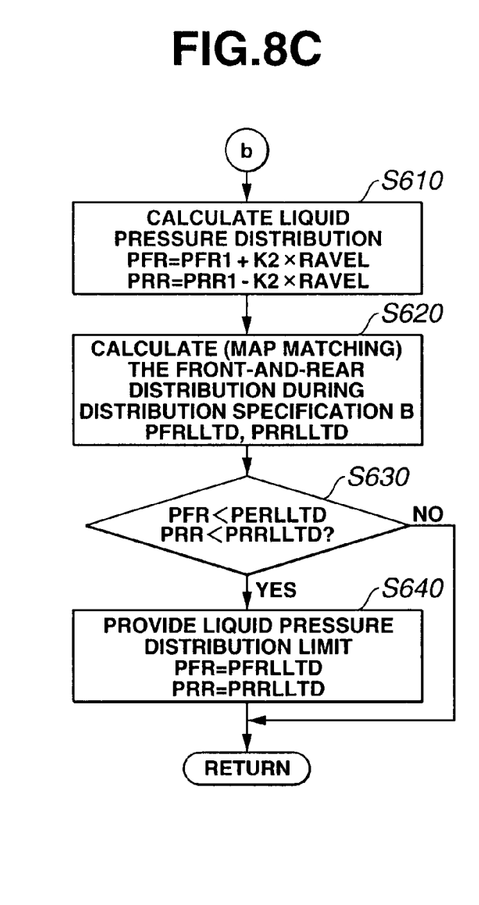

On the other hand, if controller 14 determines that the turning state of the vehicle is not toward the direction in which the turning radius becomes large (No) at step S550, the routine goes to a step S570. At step S570, controller 14 determines whether the radius of turning is transferred to the state in which the radius of the vehicular turn becomes small. In this case, if controller 14 determines that the radius of turn is not transferred to a state in which the radius of turn becomes decreased (Yes), the routine goes to a step S610. In addition, if controller 14 determines that the radius of turn is constant (No), the routine goes to a step S650. At step S650, controller 14 only replaces the previous value to the present value (PFR(n)=PFR(n−1)) and the routine is returned to step S140 of FIG. 7.

In addition, at step S610, controller 14 enlarges the liquid pressure distribution at the front road wheel side by the quantity corresponding to the variation rate of turning radius R and reduces the liquid pressure distribution at the rear road wheel side and the routine goes to a step S620.

$PFR(n)=PFR(n-1)+K2 \times RAVEL$ $PRR(n)=PRR(n-1)-K2 \times RAVEL$

It is noted that a second coefficient K2 is set to a larger value than first coefficient K1 and the distribution percentage toward the front road wheel side is increased at an earlier timing with the variation rate of the front-and-rear road wheel liquid pressure distribution enlarged in a case where turning radius is transferred toward the smaller turning radius.

At the next step S620, controller 14 derives front-and-rear road wheel distribution values PFRLLTD and PRRLLTD for target deceleration XGCO in specification distribution B and the routine goes to a step S630. At step S630, controller 14 determines whether the front-and-rear liquid pressure distribution value is larger than the ideal braking force distribution on the basis of the following equation:

$PFR(n)<PFRLLTD$ and $PRR(n)<PRRLLTD$

Figure 8D:
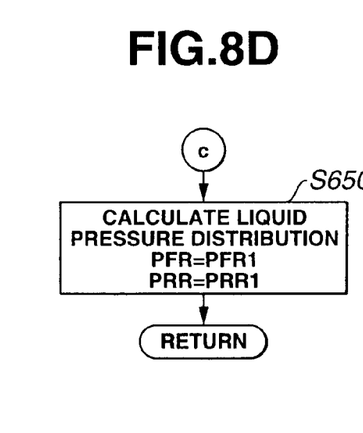

In a case where at least one of the front-and-rear liquid pressure distribution values is smaller than the value at the distribution specification B (Yes) at step S630, the routine goes to a step S640 at which the limitation is placed on the lower limit at the front-and-rear liquid pressure distribution value during the specification distribution B and the routine is returned to step S140 in FIG. 7.

$PFR(n)=PFRLLTD$ $PRR(n)=PRRLLTD$

Next, the action and advantage of the braking control apparatus in the second embodiment will be described below. In the same way as the first embodiment, during the turn of the vehicle, when the vehicle approaches to the stable turnable limit, the vehicle is positively decelerated and is controlled so that the braking is controlled in such a way that the vehicle is not in excess of the stable turnable limit irrespective of the intention of the driver. At this time, in a case where the turning state of the vehicle is in a direction such that the turning state of the vehicle becomes strong, namely, the turning radius becomes small such as a situation in which the vehicle enters a corner (cornering in), the increase in the distribution of the front road wheel side and, in other words, the distribution of the rear road wheel side is decreased to suppress the vehicle toward the oversteer tendency, thus assuring the vehicular body stability. On the other hand, in a case where the turning state becomes weak (that is to say, in the direction in which the radius of turn becomes large, especially, during a vehicular escape from the corner (cornering out)), that is to say, under a situation in which the steering wheel is steered for the steering angular position to be returned to the original position, the front-and-rear road wheel braking force distribution approaches to the ideal braking force distribution side so as to suppress the vehicular understeer tendency, thus improving the effect of the steering.

In this embodiment, furthermore, the modification speed to modify the front-and-rear braking force distribution in accordance with the turning state, namely, the speed to modify the braking force distribution from the front wheel side to the rear wheel side in a case where the vehicular state becomes strong in the turning state (namely, in the direction in which the turning radius becomes small) is set to be relatively earlier as compared with the case in which the turning state becomes weak (namely, in the direction in which the turning radius becomes large). Consequently, during the entrance of the turning and steering operation in the direction of the radius of turn becomes small during the turning, the front road wheel braking force distribution is speedily increased and the vehicular behavior variation due to the further steering operation (turning radius becomes smaller) is suppressed with the stability taken into consideration. On the other hand, under a situation in which the steering is returned to the original position (the turning radius becomes wide (large)), the braking force distribution for the rear road wheel side is increased while the variation speed of the braking force distribution becomes moderate as compared with the steering wheel operation toward the direction in which the turning radius becomes small). Hence, an abrupt variation in the oversteering tendency along with the modification of the front-and-rear road wheel distribution toward the rear road wheel direction is suppressed.

Figure 6:
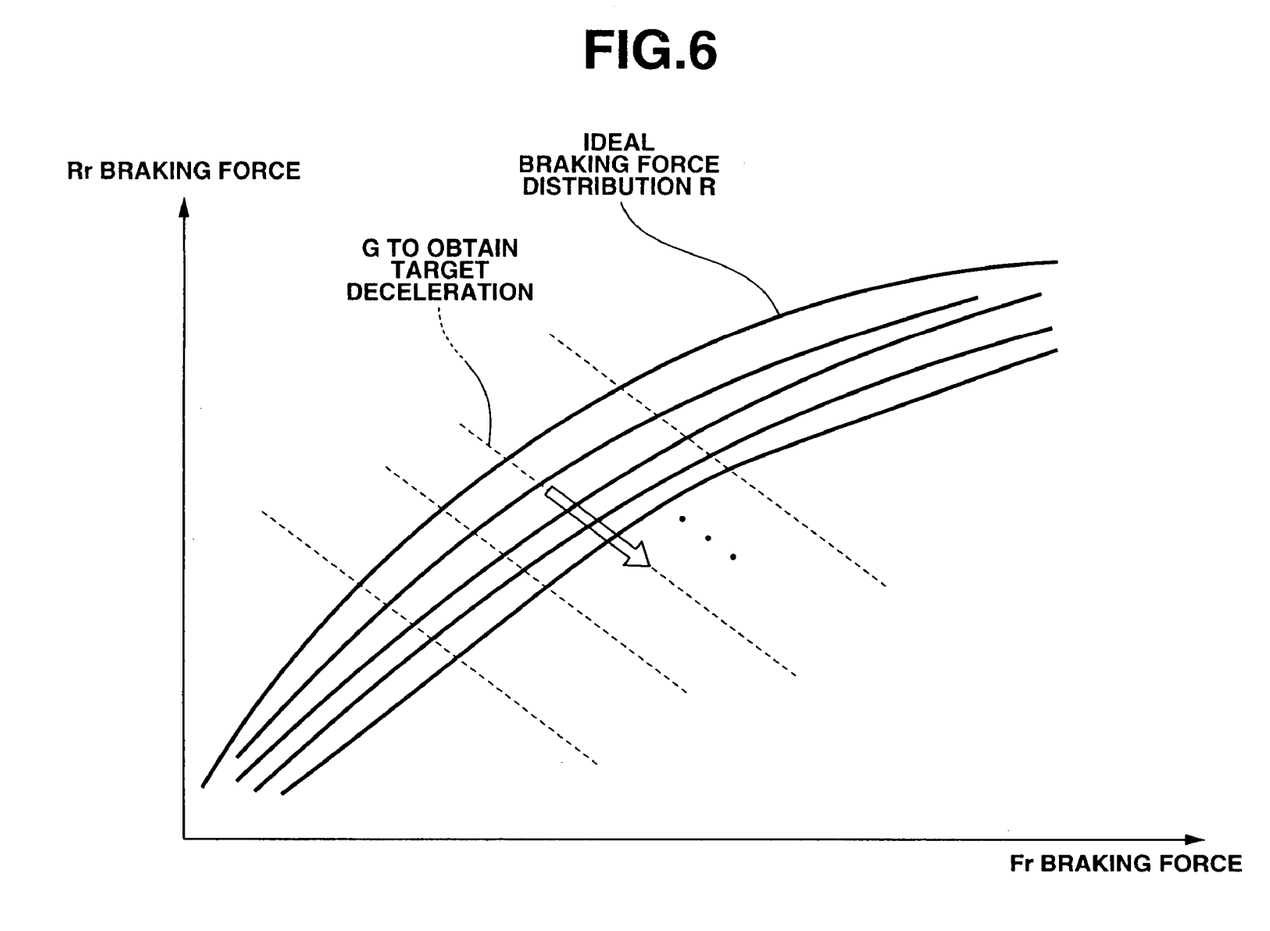
FIG. 6 is an explanatory view of another map of front-and-rear road wheel braking force distribution specifications in the braking control apparatus in the first embodiment according to the present invention shown in FIG. 1.

Furthermore, in the second embodiment, the modification speed to carry out the modification of the front-and-rear road wheel braking force distribution in accordance with the turning state, namely, the speed to modify the distribution of braking force distribution from the front road wheels to the rear road wheel side, namely, the speed to modify the braking force distribution from the front road wheel side to the rear road wheel side is modified in the turning state, it becomes possible to coincide with the actual turn of the modification of the braking force distribution. The other action and advantages are the same as those of the first embodiment described above. It is noted that, in the second embodiment, for simplicity, the front-and-rear road wheel braking force distribution is modified with reference to target deceleration XGCO at the control first cycle. However, the front-and-rear road wheel braking force distribution is not limited to this. A multiple number of braking force distribution specifications may be prepared and the front-and-rear road wheel distribution may be derived according to the braking force distribution specification used in accordance with the transfer of the turning radius and the target deceleration derived for each control cycle. However, the process of the method for control described in the second embodiment becomes simpler. In addition, the process of control may be carried out such as to perform the braking distribution described in each of the first and second embodiments. It is noted that, in FIGS. 5 and 6, a longitudinal axis denotes a rear road wheel side braking force and a lateral axis denotes a front road wheel side braking force and, in FIGS. 8A through 8D, RAVE1 denotes the previous value of RAVE and RFR1 and PPR1 denote the previous values of PFR and PPR.

The entire contents of a Japanese Patent Application No. 2003-136319 (filed in Japan on May 14, 2003) are herein incorporated by reference. The scope of the invention is defined with reference to the following claims.

What is claimed is:

1. A braking force control apparatus for an automotive vehicle, comprising:

a turning state variable detecting section that detects a turning state variable of the vehicle from a traveling state of the vehicle;

a limit vehicular turning state variable estimating section that estimates a limit turning state variable of the vehicle by which the vehicle is stably enabled to travel from the turning state variable detected by the turning state variable detecting section;

a target deceleration calculating section that calculates a target deceleration required when the vehicle approaches to a turning state variable set value set on the basis of the limit vehicular turning state variable estimated by the limit vehicular turning state variable estimating section;

a vehicular deceleration developing section that develops the target deceleration of the vehicle calculated by the target deceleration calculating section; and a front-and-rear road wheel braking force distribution determining section that determinatively distributes a front-and-rear road wheel braking force at a front-and-rear road wheel braking force distribution toward front and rear road wheel sides of the vehicle in accordance with the limit vehicular turning state to achieve the target deceleration calculated by the target deceleration calculating section, the vehicular deceleration developing section developing the target deceleration on the basis of the front-and-rear road wheel braking force distribution determined by the front-and-rear road wheel braking force distribution determining section, wherein the front-and-rear road wheel braking force distribution determining section modifies the front-and-rear road wheel braking force distribution in accordance with a variation direction of the vehicular turning state variable and relatively enlarges the front-and-rear road wheel braking force distribution toward the front road wheel side of the vehicle on the basis of the turning state variable indicating stable transfer of the turning state in a direction where a turning radius of the vehicle becomes small as compared with a case where the turning radius of the vehicle becomes large.

2. A braking force control apparatus for an automotive vehicle as claimed in claim 1, wherein the turning state variable detecting section comprises: a vehicular body velocity detecting section (14, S40) that detects a vehicular body velocity (V) from respective road wheel velocities; a steering angle detecting section that detects a steering wheel (θ) of the vehicle; a slip state calculating section that calculates a slip rate (SF1, SFr, SR1, and SRr) of each of the front and rear road wheels on the basis of the vehicular body velocity (V) and the road wheel velocities; and a turning radius calculating section that calculates a turning radius (R) of the vehicle from the vehicular body velocity (V) and a vehicular body lateral acceleration (DDY).

3. A braking force control apparatus for an automotive vehicle as claimed in claim 2, wherein the limit vehicular turning state variable estimating section comprises a limit turning radius calculating section that calculates a limit turning radius (RL) at a present vehicular body velocity (V) on the basis of the present vehicular velocity (V) and a limit turning speed calculating section that calculates a limit turning speed (VL) at a present turning radius (R) on the basis of the present turning radius (R).

4. A braking force control apparatus for an automotive vehicle as claimed in claim 3, wherein the target deceleration calculating section calculates the target deceleration on the basis of the vehicular body velocity (V), the limit vehicular body velocity (VL), the turning radius (R), and the limit turning radius (RL).

5. A braking force control apparatus for an automotive vehicle as claimed in claim 4, wherein the front-and-rear road wheel braking force distribution determining section comprises a turning radius magnitude determining section that determines whether a magnitude of the turning radius is transferred toward a smaller direction or toward a larger direction or remains unchanged toward a larger direction and a front-and-rear road wheel braking force distribution specification selecting section that selects one of predetermined front-and-rear road wheel braking force distribution specifications depending upon a result of a determination by the turning radius magnitude determining section; and a front-and-rear road wheel braking liquid pressure distribution calculating section that calculates a braking liquid pressure for each of the front and rear road wheels at the selected front-and-rear road wheel braking force distribution specification to achieve the target deceleration.

6. A braking force control apparatus for an automotive vehicle as claimed in claim 5, wherein the front-and-rear road wheel braking force distribution specification selecting section selects one of the predetermined front-and-rear road wheel braking force distribution specifications in which the distributed braking force toward the front road wheel side is larger than that toward the rear road wheel side when the turning radius magnitude determining section determines that the turning radius of the vehicle is transferred to become small or remains unchanged.

7. A braking force control apparatus for an automotive vehicle as claimed in claim 5, wherein the front-and-rear road wheel braking force distribution specification selecting section selects one of the predetermined front-and-rear road wheel braking force distribution specifications which is an ideal front-and-rear road wheel distribution specification when the turning radius magnitude determining section determines that the turning radius of the vehicle is transferred to become larger.

8. A braking force control apparatus for an automotive vehicle as claimed in claim 5, wherein the front-and-rear road wheel braking force distribution specification selecting section selects one of the predetermined front-and-rear road wheel braking force distribution specifications in which the distributed braking force toward the front road wheel side becomes larger than that toward the rear road wheel side as the turning radius of the vehicle is transferred to become smaller.

9. A braking force control apparatus for an automotive vehicle as claimed in claim 5, wherein the front-and-rear road wheel braking force distribution determining section further comprises a first control cycle determining section that determines whether the present time is a first control cycle of a braking force control and a front-and-rear road wheel braking liquid pressure distribution calculating section that calculates an initial front road wheel side distributed braking liquid pressure distribution value (PFR=PFRINI) corresponding to the target deceleration (XGCO) and an initial rear road wheel side distributed braking liquid pressure distribution value (PRR=PRRINI) corresponding to the target deceleration (XGCO) according to the selected front-and-rear road wheel braking force distribution specification in which the front road wheel side braking force distributed toward the front road wheel side is larger than the rear road wheel side braking force distributed toward the rear wheel side when the first control cycle determining section determines that the present time is the first control cycle.

10. A braking force control apparatus for an automotive vehicle as claimed in claim 9, wherein the front-and-rear road wheel braking force distribution determining section further comprises a turning radius magnitude calculating section that calculates a magnitude of the turning radius of the vehicle (RAVE) on the basis of a moving average of the detected turning radius (R) and a turning radius magnitude transfer direction determining section that determines whether the turning radius of the vehicle is transferred to become larger depending upon a result of a calculation by the turning radius magnitude calculating section when the first control cycle determining section determines that the present time is not the first control cycle.

11. A braking force control apparatus for an automotive vehicle as claimed in claim 10, wherein the turning radius magnitude calculating section calculates a variation speed of the magnitude of the turning radius on the basis of a difference value (RAVEL) of a present moving average of the turning radius and a previous moving average thereof (RAVEL=RAVE(n)−RAVE(n−1), wherein n denotes a present value).

12. A braking force control apparatus for an automotive vehicle as claimed in claim 11, wherein the front-and-rear road wheel braking liquid pressure distribution calculating section calculates a front road wheel side braking liquid pressure distribution value (PFR(n)) to achieve the target deceleration (XGCO) and a rear road wheel side braking liquid pressure distribution value (PRR(n)) to achieve the target deceleration (XGCO) as follows according to the selected front-and-rear road wheel braking force distribution specification: PFR(n)=PFR(n−1)−K1×RAVEL and PRR(n)=PRR(n−1)+K1±RAVEL, wherein k1 denotes a first coefficient, when the turning radius magnitude determining section determines that the magnitude of the turning radius is transferred to become larger.

13. A braking force control apparatus for an automotive vehicle as claimed in claim 11, wherein the front-and-rear road wheel braking liquid pressure distribution calculating section calculates a front road wheel side braking liquid pressure distribution value (PFR(n)) to achieve the target deceleration (XGCO) and a rear road wheel side braking liquid pressure distribution value (PRR(n)) to achieve the target deceleration (XGCO) as follows according to the selected front-and-rear road wheel braking force distribution specification: PFR(n)=PFR(n−1)+K2×RAVEL and PRR(n)=PRR(n−1)−K2×RAVEL, wherein K2 denotes a second coefficient and K1<K2, wherein K1 denotes a first coefficient, when the turning radius magnitude determining section determines that the magnitude of the turning radius is transferred to become smaller.

14. A braking force control apparatus for an automotive vehicle as claimed in claim 13, wherein limitations are placed on the front and rear road wheel side braking liquid pressure distribution values PFR(n) and PRR(n), respectively, by predetermined braking liquid pressure distribution values (PFRLLTD, PRRLLTD).

15. A braking force control apparatus for an automotive vehicle as claimed in claim 1, wherein the front-and-rear road wheel braking force distribution determining section modifies the front-and-rear road wheel braking force distribution in accordance with a variation direction of the vehicular turning state variable and returns the front-and-rear road wheel braking force distribution to an ideal braking force distribution on the basis of the turning state variable in a case where a vehicular steering is returned to go out of a cornering as compared with a case where the vehicle is steered to enter cornering.

16. A braking force control apparatus for an automotive vehicle as claimed in claim 1, wherein the direction where a turning radius of the vehicle becomes small is a case in which the vehicle enters a corner.

17. A braking force control apparatus for an automotive vehicle as claimed in claim 1, wherein the direction where a turning radius of the vehicle becomes large is a case in which the vehicle leaves a corner.

18. A braking force control apparatus for an automotive vehicle, comprising:
- a turning state variable detecting section that detects a turning state variable of the vehicle from a traveling state of the vehicle;
- a limit vehicular turning state variable estimating section that estimates a limit turning state variable of the vehicle by which the vehicle is stably enabled to travel from the turning state variable detected by the turning state variable detecting section;
- a target deceleration calculating section that calculates a target deceleration required when the vehicle approaches to a turning state variable set value set on the basis of the limit vehicular turning state variable estimated by the limit vehicular turning state variable estimating section;
- a vehicular deceleration developing section that develops the target deceleration of the vehicle calculated by the target deceleration calculating section; and
- a front-and-rear road wheel braking force distribution determining section that determinatively distributes a front-and-rear road wheel braking force at a front-and-rear road wheel braking force distribution toward front and rear road wheel sides of the vehicle in accordance with the limit vehicular turning state to achieve the target deceleration calculated by the target deceleration calculating section, the vehicular deceleration developing section developing the target deceleration on the basis of the front-and-rear road wheel braking force distribution determined by the front-and-rear road wheel braking force distribution determining section, wherein the front-and-rear road wheel braking force distribution detecting section modifies a variation speed of the front-and-rear road wheel braking force distribution in accordance with the turning state variable of the vehicle.

19. A braking force control apparatus for an automotive vehicle, comprising:
- a turning state variable detecting section that detects a turning state variable of the vehicle from a traveling state of the vehicle;
- a limit vehicular turning state variable estimating section that estimates a limit turning state variable of the vehicle by which the vehicle is stably enabled to travel from the turning state variable detected by the turning state variable detecting section;
- a target deceleration calculating section that calculates a target deceleration required when the vehicle approaches to a turning state variable set value set on the basis of the limit vehicular turning state variable estimated by the limit vehicular turning state variable estimating section;
- a vehicular deceleration developing section that develops the target deceleration of the vehicle calculated by the target deceleration calculating section; and
- a front-and-rear road wheel braking force distribution determining section that determinatively distributes a front-and-rear road wheel braking force at a front-and-rear road wheel braking force distribution toward front and rear road wheel sides of the vehicle in accordance with the limit vehicular turning state to achieve the target deceleration calculated by the target deceleration calculating section, the vehicular deceleration developing section developing the target deceleration on the basis of the front-and-rear road wheel braking force distribution determined by the front-and-rear road wheel braking force distribution determining section, wherein the front-and-rear braking force distribution determining section sets a variation speed of the front-and-rear road wheel braking force distribution in such a manner that the variation speed becomes fast in a case where a turning radius of the vehicle is transferred to become small as compared with a case where the turning radius of the vehicle is transferred to become large.

20. A braking force control apparatus for an automotive vehicle, comprising:
- turning state variable detecting means for detecting a turning state variable of the vehicle from a traveling state of the vehicle;
- limit vehicular turning state variable estimating means for estimating a limit turning state variable of the vehicle by which the vehicle is stably enabled to travel from the turning state variable detected by the turning state variable detecting means;
- target deceleration calculating means for calculating a target deceleration required when the vehicle approaches to a turning state variable set value set on the basis of the limit vehicular turning state variable estimated by the limit vehicular turning state variable estimating means;
- vehicular deceleration developing means for developing the target deceleration of the vehicle calculated by the target deceleration calculating means; and
- front-and-rear road wheel braking force distribution determining means for determinatively distributing a front-and-rear road wheel braking force at a front-and-rear road wheel braking force distribution toward front and rear road wheel sides of the vehicle in accordance with the vehicular turning state to achieve the target deceleration calculated by the target deceleration calculating means, the vehicular deceleration developing means developing the target deceleration on the basis of the front-and-rear road wheel braking force distribution determined by the front-and-rear road wheel braking force distribution determining means, wherein the front-and-rear road wheel braking force distribution determining means modifies the front-and-rear braking force distribution in accordance with a variation direction of the vehicular turning state variable and relatively enlarges the front-and-rear road wheel braking force distribution toward the front road wheel side of the vehicle on the basis of the turning state variable indicating stable transfer of the turning state in a direction where a turning radius of the vehicle becomes small as compared with a case where the turning radius of the vehicle becomes large.

21. A braking force control method for an automotive vehicle, comprising:
- detecting a turning state variable of the vehicle from a traveling state of the vehicle;

estimating a limit turning state variable of the vehicle by which the vehicle is stably enabled to travel from the detected turning state variable;

calculating a target deceleration required when the vehicle approaches to a turning state variable set value set on the basis of the estimated limit vehicular turning state variable;

developing the target deceleration of the vehicle calculated by the target deceleration calculating means; and determinatively distributing a front-and-rear road wheel braking force at a front-and-rear road wheel braking force distribution toward front and rear road wheel sides of the vehicle in accordance with the calculated vehicular turning state to achieve the target deceleration, at the vehicular deceleration developing, developing the target deceleration on the basis of the determined front-and-rear road wheel braking force distribution, and when determinatively distributing the front-and-rear road wheel braking force, the front-and-rear road wheel braking force distribution is modified in accordance with a variation direction of the vehicular turning state variable and the front-and-rear road wheel braking force distribution toward the front road wheel side of the vehicle is relatively enlarged on the basis of the turning state variable indicating stable transfer of the turning state in a direction where a turning radius of the vehicle becomes small as compared with a case where the turning radius of the vehicle becomes large.

* * * * *